(12) United States Patent
Shoham et al.

(10) Patent No.: US 7,609,633 B2
(45) Date of Patent: Oct. 27, 2009

(54) BANDWIDTH POLICER WITH COMPACT DATA STRUCTURE

(75) Inventors: Doron Shoham, Shoham (IL); Rami Zemach, Givat Shapira (IL)

(73) Assignee: Cisco Technology, Inc., San Jose, CA (US)

( * ) Notice: Subject to any disclaimer, the term of this patent is extended or adjusted under 35 U.S.C. 154(b) by 590 days.

(21) Appl. No.: 11/451,849

(22) Filed: Jun. 12, 2006

(65) Prior Publication Data

US 2007/0286075 A1 Dec. 13, 2007

(51) Int. Cl.
*H04L 12/28* (2006.01)
*G06F 11/00* (2006.01)
*H04Q 7/00* (2006.01)
(52) U.S. Cl. .................... 370/230.1; 370/235; 370/329; 370/395.21
(58) Field of Classification Search ......... 370/229–238, 370/252, 328–329, 428–468, 395.21
See application file for complete search history.

(56) References Cited

U.S. PATENT DOCUMENTS

2002/0089929 A1* 7/2002 Tallegas et al. ............. 370/230

OTHER PUBLICATIONS

Shreedhar, et al., "Efficient Fair Queuing Using Deficit Round Robin", Proceedings of the Conference on Applications, Technologies, Architectures, and Protocols For Computer Communication, Aug. 28-Sep. 1, 1995, Cambridge, Massachusetts, pp. 231-242.

* cited by examiner

*Primary Examiner*—Afsar M. Qureshi
(74) *Attorney, Agent, or Firm*—Abelman, Frayne & Schwab

(57) ABSTRACT

A method for controlling data transmission includes setting a respective rate criterion for each of a plurality of interfaces of a network element. Upon conveying a first data packet of a first size via a given interface of the network element at a first time, a time-stamp value is computed based on the first time, the first size and the respective rate criterion that is set for the given interface. A disposition of a second packet for conveyance via the given interface at a second time, subsequent to the first time, is determined responsively to the time-stamp value.

19 Claims, 2 Drawing Sheets

BANDWIDTH POLICER WITH COMPACT DATA STRUCTURE

FIELD OF THE INVENTION

The present invention relates generally to packet network communications, and specifically to methods and devices for traffic rate policing.

BACKGROUND OF THE INVENTION

Networks police traffic by limiting the input or output transmission rate of a class of traffic based on user-defined criteria. Policing traffic allows the user (typically a network service provider or other system operator) to control the maximum rate of traffic sent or received on an interface and to partition a network into multiple priority levels or classes of service (CoS). A traffic policer is often configured on interfaces at the edge of a network to limit the rate of traffic entering or leaving the network. In the most common configurations, traffic that conforms to the given rate limit is sent through the interface, while traffic that exceeds the limit is sent with a decreased priority or is dropped. Users can change these configuration options to suit their network needs.

Traffic policing features are often built into network switches, such as routers, and other network access equipment. For example, Cisco Systems (San Jose, Calif.) offers a "Two-Rate Policer" as part of its IOS software package for Cisco routers. The Two-Rate Policer performs the following functions:

Limits the input or output transmission rate of a class of traffic based on user-defined criteria.

Marks packets by setting the IP precedence value, IP differentiated services code point (DSCP) value, Multiprotocol Label Switching (MPLS) experimental value, Quality of Service (QoS) group, ATM Cell Loss Priority (CLP) bit, and/or the Frame Relay Discard Eligibility (DE) bit.

The Two-Rate Policer enables users to enforce traffic policing according to two separate rates: committed information rate (CIR) and peak information rate (PIR).

The Two-Rate Policer manages the maximum rate of traffic using a token bucket algorithm, as is known in the art. This algorithm applies user-configured values to determine the maximum rate of traffic allowed on an interface at a given moment in time. The token bucket algorithm provides users with three actions for each packet: a conform action, an exceed action, and an optional violate action. Within these three categories, users can decide on packet treatments. For instance, packets that conform can be configured to be sent, packets that exceed can be configured to be sent with a decreased priority, and packets that violate can be configured to be dropped.

The present invention will be more fully understood from the following detailed description of the embodiments thereof, taken together with the drawings in which:

DETAILED DESCRIPTION OF EMBODIMENTS

Figure 1:
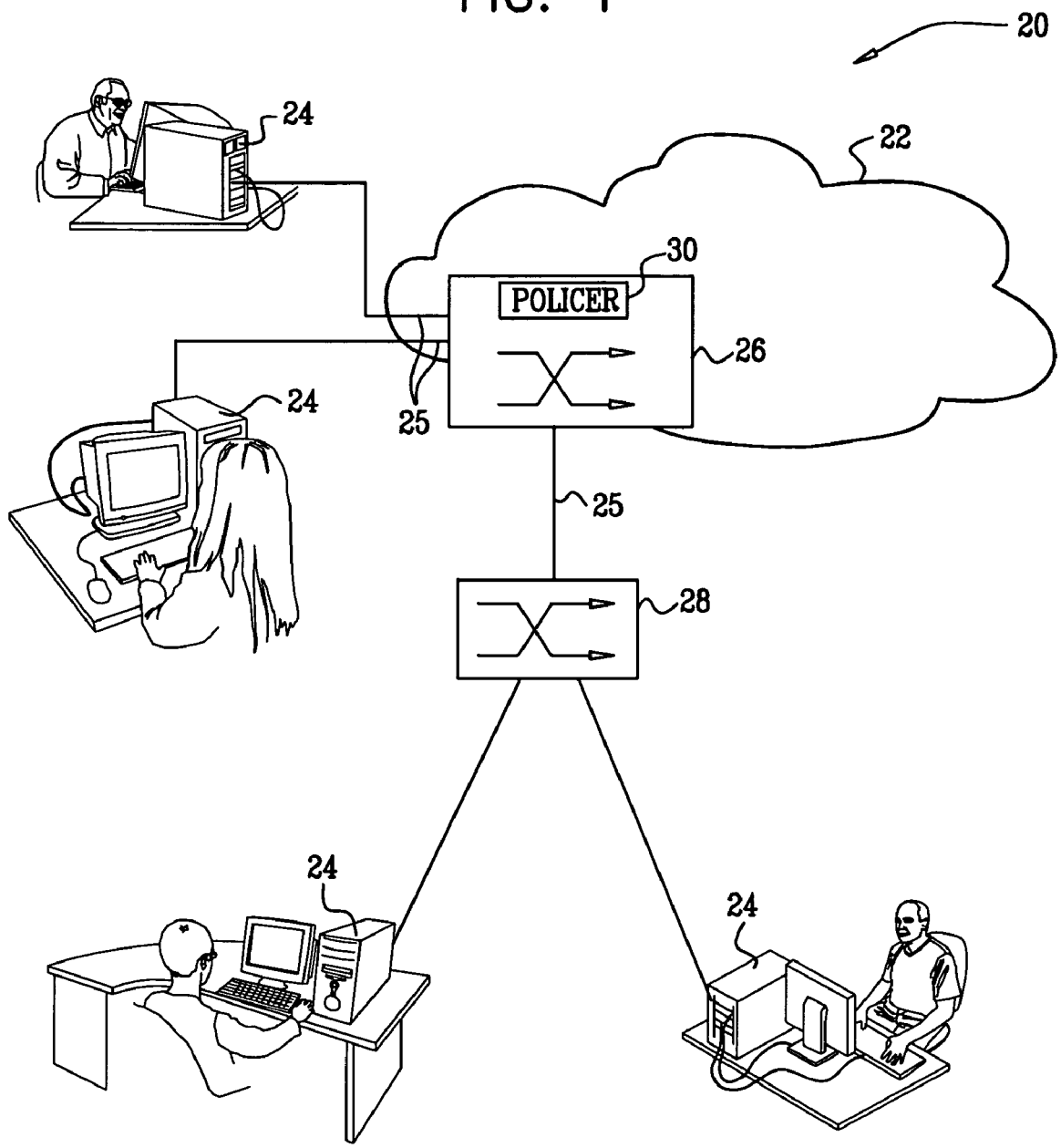
FIG. 1 is a block diagram that schematically illustrates a network access system with traffic policing, in accordance with an embodiment of the present invention.

FIG. 1 is a block diagram that schematically illustrates a network access system 20, which permits user computers 24 to access a packet network 22, in accordance with an embodiment of the present invention. The users access the network via a switch 26, such as a router, which is located at the network edge. User computers 24 may be connected to interfaces 25 of switch 26 either directly or via other network elements, such as an aggregating switch 28. In the context of the present patent application and in the claims, the term "interface" should be understood broadly to mean any connection between a network element and a network node or group of nodes that communicate with the network element. "Interfaces" in this context may comprise virtual, as well as physical, connections, and multiple virtual interfaces may share a common physical interface. Furthermore, although in the exemplary embodiment of FIG. 1, switch 26 is configured as a network access device, the principles of the present invention are equally applicable to any type of network element that enforces bandwidth allocations on its interfaces.

Each interface of switch 26 is allocated a certain bandwidth for transmission of packets through the switch. The bandwidth allocations may apply to transmission of packets from users 24 to network 22 (ingress) and/or from the network to the users (egress), and different allocations may be assigned for ingress and egress traffic. A given interface may have multiple bandwidth allocations, such as a CIR and PIR, as mentioned in the Background of the Invention. For the sake of simplicity, however, the description that follows will relate only to policing of a single bandwidth allocation for a given interface. Extension of the techniques described hereinbelow to multiple bandwidth allocations is straightforward and is considered to be within the scope of the present invention.

A policer 30 is responsible for enforcing the bandwidth allocations. For this purpose, the policer maintains a token bucket for each bandwidth allocation of each interface. The bucket is filled with bandwidth "credits" at a bit rate equal to the allocated bandwidth, (which is typically expressed in terms of an equivalent data rate criterion, in bits/sec), up to a certain maximum fill level. Each packet transmitted through the interface removes a number of the credits that is equal to the packet size. As long as the bucket is not empty, each packet is transmitted normally through the interface. (There may also be a provision for "negative credits" to permit normal transmission of a large packet that empties the bucket.) When the bucket is empty, however, packets arriving at the interface are typically marked for transmission at lower priority or are discarded.

Figure 2:
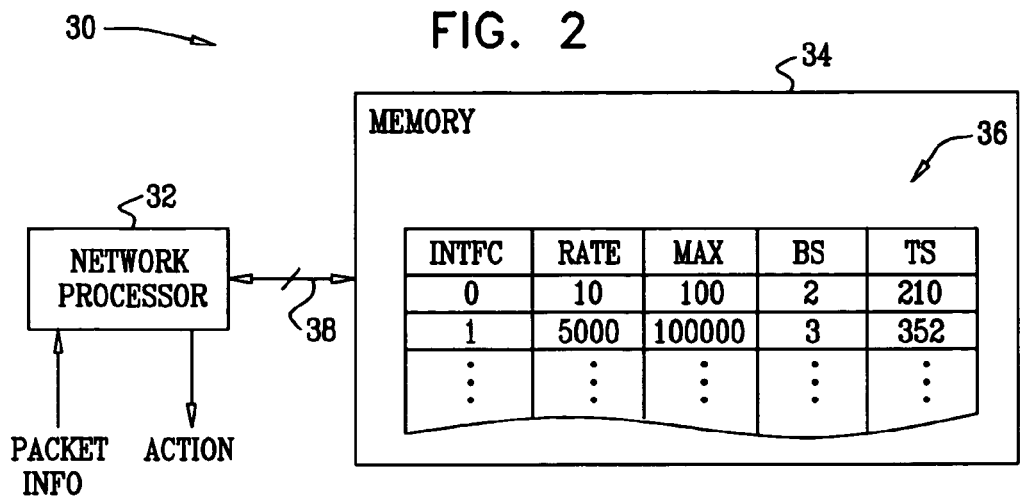
FIG. 2 is a block diagram that schematically shows details of a traffic policer, in accordance with an embodiment of the present invention.

FIG. 2 is a block diagram that schematically shows details of policer 30, in accordance with an embodiment of the present invention. Policer 30 comprises a network processor 32, which is connected to a memory 34 by a bus 38. The policer receives information regarding incoming packets on the interfaces of switch 26, checks the packet size against bucket information held in a data structure 36 in memory 34, and then returns instructions to the interfaces regarding disposition of each packet. Typically, network processor 32 comprises a programmable integrated circuit device, which is programmed in software to carry out the functions described herein. The software may be downloaded to the network processor in electronic form. Alternatively or additionally, the software may be provided and/or stored in tangible media, such as optical, magnetic, or electronic storage media. Optionally, the network processor may be programmed to perform additional functions in switch 26, which are beyond the scope of the present invention. Further alternatively or additionally, the network processor may comprise dedicated or programmable hardware circuits.

Data structure 36 comprises both dynamic and static information for each interface (listed as INTFC 0, 1, . . . , in the figure). The static information includes the allocated bandwidth of the interface, in the form of the corresponding data rate (RATE, presented here in kbps, for example), and the maximum bucket fill level (MAX). The MAX level governs the maximum burst size that may be allowed on the interface after a period of inactivity. The dynamic information includes a bucket size remainder (BS) and a time-stamp value (TS). These latter values are typically updated every time a packet is transmitted through the interface, and may also be refreshed periodically by the network processor during periods of inactivity of the interface, as will be explained hereinbelow.

For computational efficiency, it is desirable that bus 38 be wide enough to transfer the dynamic information regarding each interface in a single clock cycle. It can be seen in the example in FIG. 2, however, that actual bucket sizes (in terms of RATE and MAX values) can vary by orders of magnitude among the interfaces of the switch. Therefore, if a conventional scheme is used for recording the dynamic information, it may be necessary to make bus 38 very wide, which increases the cost and complication of the network processor.

In order to overcome this constraint, embodiments of the present invention use time-stamp values that reflect not only the time at which the most recent packet was transmitted through the interface in question, but also the bucket fill level (as determined by the size of the packet and the respective rate criterion that is set for the given interface), less a certain remainder, as explained hereinbelow. This approach is based on the realization that when the network processor must decide how to treat a given packet based on a bucket fill level given by BS with time stamp TS (which may be represented by the couple <BS,TS>) in data structure 36, the disposition will be the same as if the data structure contained <BS–R, TS–1> or <BS–nR,TS–n> or <BS+R,TS+1>. (In these expressions, TS is measured in clock ticks; n is an arbitrary integer; and R is the RATE value in bits, or multi-bit units, such as kilobits, per clock tick.) As a result, in setting the time-stamp value after transmitting a packet on a given interface, the network processor may arbitrarily "roll back" the time to TS–n to reflect the approximate bucket fill level (in units of R for that interface), and then may place a small value in BS to represent the remainder. The bucket fill level is thus stored in a compressed form, without loss of information, and the width of bus 38 may be reduced accordingly. Details of the computations performed by the network processor are presented hereinbelow.

Figure 3:
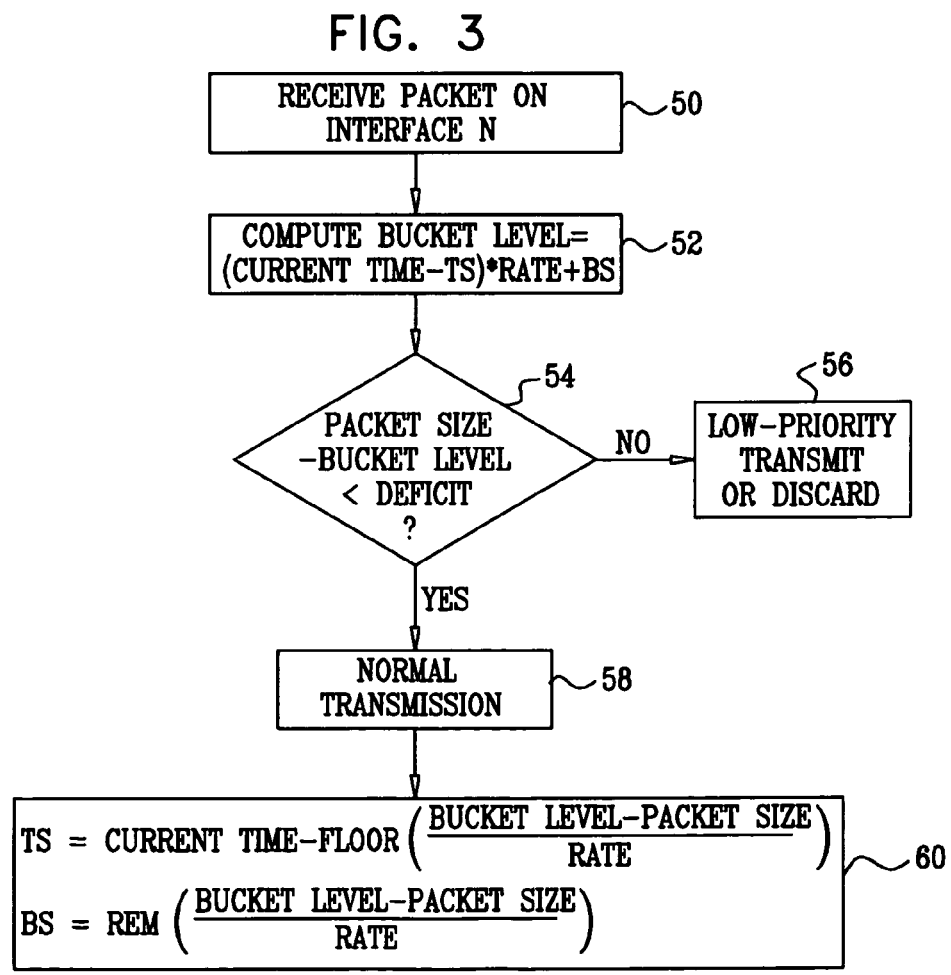
FIG. 3 is a flow chart that schematically illustrates a method for traffic policing, in accordance with an embodiment of the present invention.

FIG. 3 is a flow chart that schematically illustrates a method for traffic policing based on the principles outlined above, in accordance with an embodiment of the present invention. The method is described, for the sake of clarity, with reference to switch 26 and policer 30 and to the preceding figures, but may similarly be implemented in other rate policing applications. The method is initiated each time switch 26 receives a packet for forwarding (ingress or egress) via a given interface, referred to arbitrarily in FIG. 3 as "interface N," at a packet reception step 50. Optionally, a dummy, zero-length packet may be input to the interface at this step for periodic bucket refilling on inactive interfaces, as described further hereinbelow.

Processor 32 computes the current bucket fill level, at a bucket computation step 52, according to the formula:

$$\text{BUCKET LEVEL} = (\text{CURRENT TIME} - TS)*R + BS$$

For example, referring to interface 1 in data structure 36 (FIG. 2), if the current time is 360, then the bucket fill level—representing the size of the largest burst that may be permitted on the interface at the current time—will be (360−352)*5000+3=40,003 kb. The same bucket fill level would result, for instance, for TS=359 and BS=35,003, but a wider bus 38 and more memory would then be required to hold the BS value.

Processor 32 determines the difference between the size of the current packet and the computed bucket fill level, at a bandwidth availability computation step 54. The difference is compared to a predetermined deficit threshold. This threshold may be set to a positive value in order to permit normal transmission of large packets that momentarily exceed the allocated bucket size. Alternatively, the deficit threshold may be set to zero.

If the difference between the packet size and bucket fill level is greater than the deficit threshold, processor 32 instructs the interface in question to treat the current packet as an over-quota packet, at an over-quota treatment step 56. In this case, switch 26 may drop the packet, or it may alternatively transmit the packet with a reduced priority. In cases in which both CIR and PIR are allocated on the interface, step 54 may compare the packet to the fill level of the current CIR bucket, and the packet may then be compared, if necessary, to the fill level of the current PIR bucket at step 56 in order to determine whether to transmit the packet with reduced priority or discard it. Various other multi-bucket schemes may be built on the basic method shown in FIG. 3, as will be apparent to those skilled in the art. In cases of multi-bucket policing, data structure 36 will contain multiple BS and TS values for each interface—typically one BS and one TS for each bucket.

If the difference between the packet size and the bucket fill level is less than the deficit threshold, processor 32 instructs the interface to transmit the packet normally, at a normal transmission step 58. Following this step, the processor computes new values of BS and TS, at a dynamic information computation step 60. The time-stamp value TS is typically set not to the current time, as in systems known in the art, but rather to a modified value based on the bucket fill level computed at step 52 and the size of the packet transmitted at step 58:

$$TS = \text{CURRENT TIME} - \text{FLOOR}\left[\frac{\text{BUCKET LEVEL} - \text{PACKET SIZE}}{R}\right]$$

(Here the function FLOOR rounds the operand down to the nearest integer value.) The remainder is stored as follows:

$$BS = \text{REM}\left[\frac{\text{BUCKET LEVEL} - \text{PACKET SIZE}}{R}\right]$$

Processor 32 stores these values in the appropriate fields of data structure 36, for use in processing the next packet to be received on this interface. Although the above formula will usually result in TS being set to a value earlier than the current time, TS may be rolled forward to a value later than the current time if the packet size was greater than the current bucket fill level, but the packet was nonetheless transmitted normally at step 58.

If an interface is inactive for an extended period, the bucket fill level computed at step 52 may be greater than the MAX level specified in data structure 36. In such cases, processor 32 typically sets the bucket to the MAX value. Furthermore, to avoid anomalous results, processor 32 may periodically refresh the dynamic information of inactive interfaces by setting BS=0 and TS=CURRENT TIME−MAX/R. This result may conveniently be achieved by periodically inputting a zero-length packet to each inactive interface at step 50, as mentioned above.

Although the embodiments described above used a token bucket algorithms for bandwidth policing, the principles of the present invention may similarly be applied in conjunction with other methods of policing that use timestamps. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for controlling data transmission, comprising:
   setting a respective rate criterion comprising an allocated data transmission rate for each of a plurality of interfaces of a network element;
   conveying a first data packet of a first size via a given interface of the network element at a first time;
   computing and setting a time-stamp value which differs from the first time by an amount which is a predetermined function of: a burst size permitted on the given interface at the first time, the first size and the respective rate criterion that is set for the given interface; and
   determining a disposition of a second packet for conveyance via the given interface at a second time, subsequent to the first time, responsively to the time-stamp value.

2. The method according to claim 1, wherein setting the respective rate criterion comprises setting multiple rate criteria for the given interface, and wherein computing the time-stamp value comprises computing multiple time-stamp values corresponding to the multiple rate criteria.

3. The method according to claim 1, wherein the second packet has a second size, and wherein determining the disposition comprises computing a permitted burst size based on the time-stamp value, and comparing the second size to the permitted burst size.

4. The method according to claim 3, wherein determining the disposition comprises at least one of discarding the second packet and transmitting the second packet at a reduced priority level if the second size exceeds the permitted burst size by a difference that is greater than a predetermined threshold.

5. The method according to claim 1 wherein the predetermined function is a quotient of a difference between the burst size and the first size divided by the respective rate criterion.

6. The method according to claim 5, and comprising computing a remainder value of the quotient, wherein determining the disposition comprises computing the burst size permitted at the second time responsively to the time-stamp value and the remainder value.

7. A device for controlling data transmission, comprising:
   a memory, which is configured to store policing data with respect to each of a plurality of interfaces of a network element, the policing data comprising a respective rate criterion comprising an allocated data transmission rate for each of the interfaces; and
   a network processor, which is coupled to receive an indication of a first data packet of a first size that is to be transmitted via a given interface of the network element at a first time, to read the policing data from the memory with respect to the given interface and to compute and set a time-stamp value which differs from the first time by an amount which is a predetermined function of: a burst size permitted on the given interface at the first time, the first size and the respective rate criterion that is set for the given interface, and to determine a disposition of a second packet for conveyance via the given interface at a second time, subsequent to the first time, responsively to the time-stamp value.

8. The device according to claim 7, wherein the policing data comprise multiple rate criteria for the given interface, and wherein the network processor is arranged to compute multiple time-stamp values corresponding to the multiple rate criteria.

9. The device according to claim 7, wherein the second packet has a second size, and the network processor is arranged to compute a permitted burst size based on the time-stamp value, and to compare the second size to the permitted burst size in order to determine the disposition of the second packet.

10. The device according to claim 9, wherein the disposition comprises at least one of discarding the second packet and transmitting the second packet at a reduced priority level if the second size exceeds the permitted burst size by a difference that is greater than a predetermined threshold.

11. The device according to claim 7 wherein the predetermined function is a quotient of a difference between the burst size and the first size divided by the respective rate criterion.

12. The device according to claim 11, wherein the network processor is arranged to compute a remainder value of the quotient, and to compute the burst size permitted at the second time responsively to the time-stamp value and the remainder value.

13. The apparatus according to claim 11, wherein the traffic policer is arranged to compute a remainder value of the quotient, and to compute the burst size permitted at the second time responsively to the time-stamp value and the remainder value.

14. Apparatus for conveying packets over a network, the apparatus comprising:
   a plurality of interfaces, for connection to other network nodes; and
   a traffic policer, which is coupled to store a respective rate criterion comprising an allocated data transmission rate for each of the plurality of interfaces, and upon conveyance of a first data packet of a first size via a given interface at a first time, to compute and set a time-stamp value which differs from the first time by an amount which is a predetermined function of: a burst size permitted on the given interface at the first time, the first size and the respective rate criterion that is set for the given interface, and to determine a disposition of a second packet for conveyance via the given interface at a second time, subsequent to the first time, responsively to the time-stamp value.

15. The apparatus according to claim 14, wherein the policing data comprise multiple rate criteria for the given interface, and wherein the traffic policer is arranged to compute multiple time-stamp values corresponding to the multiple rate criteria.

16. The apparatus according to claim 14, wherein the second packet has a second size, and the traffic policer is arranged to compute a permitted burst size based on the time-stamp value, and to compare the second size to the permitted burst size in order to determine the disposition of the second packet.

17. The apparatus according to claim 16, wherein the disposition comprises at least one of discarding the second packet and transmitting the second packet at a reduced priority level if the second size exceeds the permitted burst size by a difference that is greater than a predetermined threshold.

18. The apparatus according to claim 14, wherein the predetermined function is a quotient of a difference between the burst size and the first size divided by the respective rate criterion.

19. Apparatus for controlling data transmission, comprising:
- means for setting a respective rate criterion comprising an allocated data transmission rate for each of a plurality of interfaces of a network element;
- means for conveying a first data packet of a first size via a given interface of the network element at a first time;
- means for computing and setting a time-stamp value which differs from the first time by an amount which is a predetermined function of: a burst size permitted on the given interface at the first time, the first size and the respective rate criterion that is set for the given interface; and
- means for determining a disposition of a second packet for conveyance via the given interface at a second time, subsequent to the first time, responsively to the time-stamp value.

* * * * *

UNITED STATES PATENT AND TRADEMARK OFFICE
CERTIFICATE OF CORRECTION

PATENT NO. : 7,609,633 B2 Page 1 of 1
APPLICATION NO. : 11/451849
DATED : October 27, 2009
INVENTOR(S) : Shoham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this

Twelfth Day of October, 2010

David J. Kappos
*Director of the United States Patent and Trademark Office*